United States Patent Office
2,929,640
Patented Mar. 22, 1960

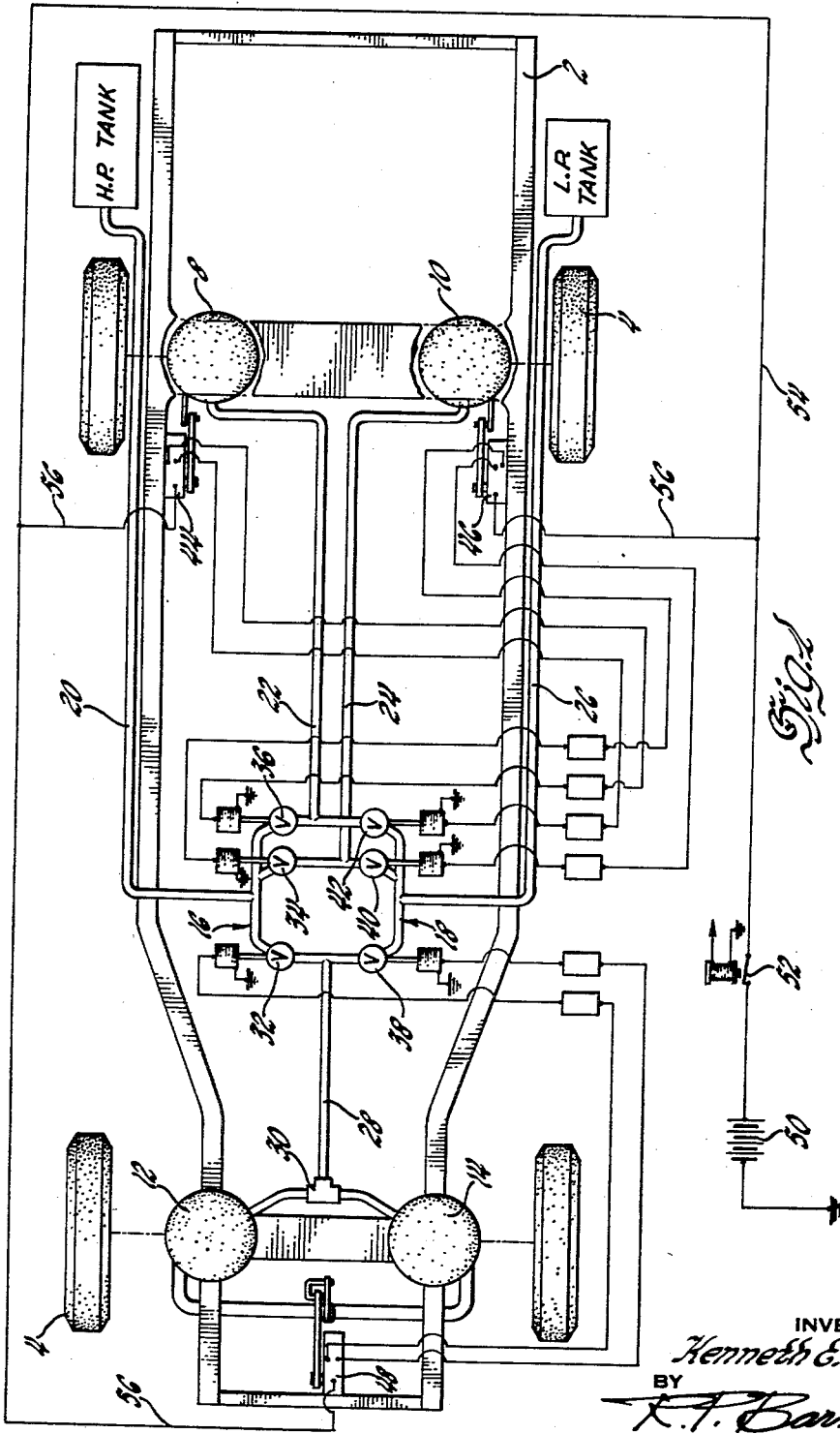

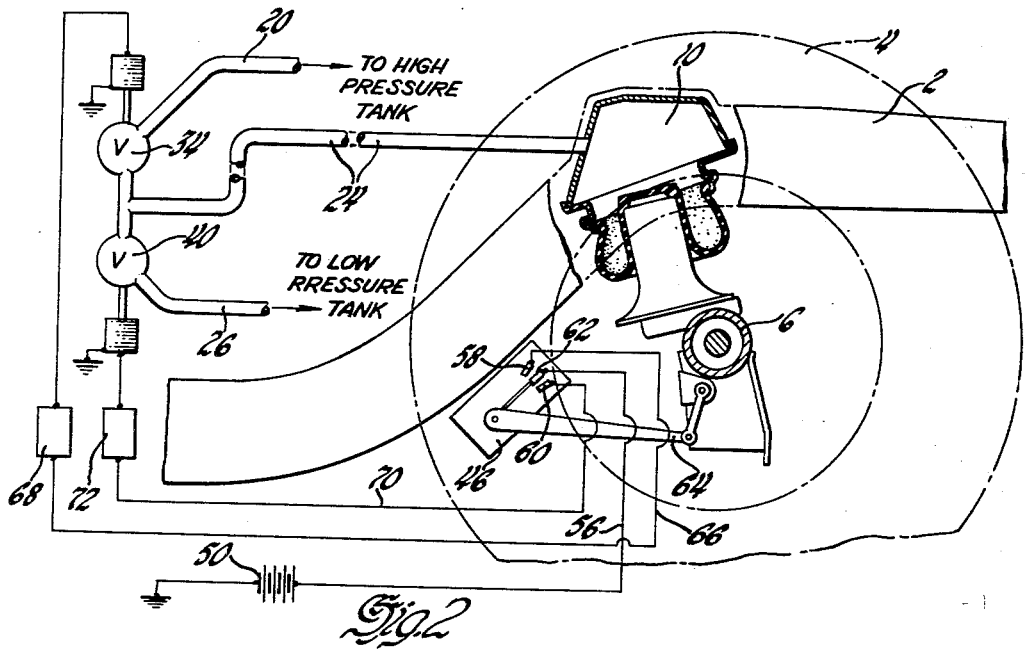
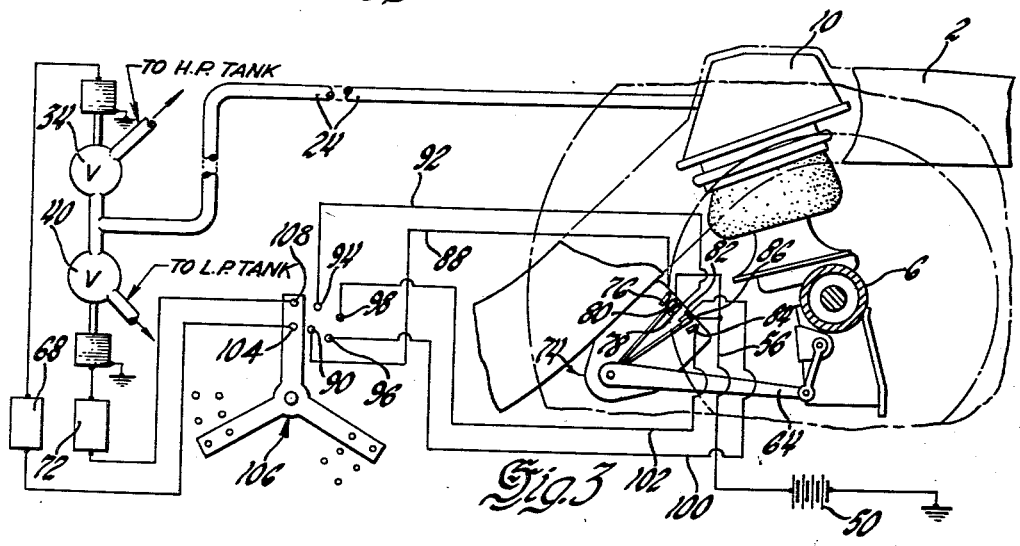
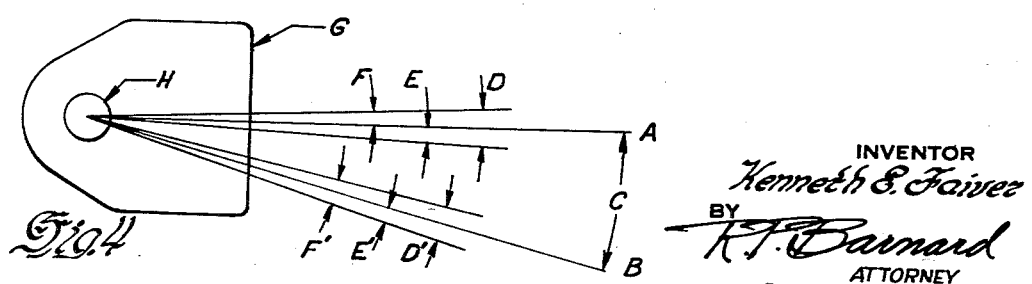

2,929,640
HEIGHT ADJUSTER FOR AUTOMOBILE SUSPENSION

Kenneth E. Faiver, Lansing, Mich., assignor to General Motors Corporation, Detroit, Mich., a corporation of Delaware Application May 6, 1957, Serial No. 657,170

12 Claims. (Cl. 280—124)

The present invention relates to a vehicle suspension mechanism and, in particular, to a control means used in conjunction therewith by which the vehicle operator may adjust the trim or standing height of the vehicle a preselected amount as desired.

The present invention, as will appear more fully hereinafter, is intended to enable the operator of an automotive vehicle to conveniently change the standing height of the latter. The normal designed vehicle height, being relatively low for appearance and stability reasons, is very satisfactory for driving over most roads and highways, but for excursions over some side roads having high crown or deep ruts, it becomes desirable to raise the car height for increased road clearance. On the other hand, some vehicle owners would appreciate a device of the type to be herein described for lowering the standing height of a vehicle from its normal height to achieve a racing or sports car appearance while traveling on smooth level roads.

As will appear more fully hereinafter, the specific height adjusting device to be described herein is essentially an electric switch which can be used on any type of suspension where the height is controlled electrically. This would include vehicles which are equipped with strictly mechanical height control such as a torsion rod suspension in which an electric motor is used to control the torsion and thereby the vehicle height, or hydraulic or air-hydraulic suspension systems wherein vehicle height is sensed and controlled by electrically operated devices, or air suspension systems where air flow and car height are controlled by solenoid operated valves which are energized through height-sensing switches. For the purpose of illustrating this invention, a suspension mechanism of the latter type is shown in the accompanying drawings.

Such an electrically controlled air suspension mechanism typically comprises a plurality of air springs operatively connected between the sprung mass of the vehicle, including the vehicle frame, and the unsprung portion thereof which includes the ground-engaging vehicle wheels. Air is selectively supplied to the respective air springs through a high pressure line and is exhausted therefrom to atmosphere, if an "open" system is employed, or through a low pressure line to a low pressure tank if a "closed" system is employed. Moreover, electrically operated normally closed solenoid valves are utilized to control the supply of air through the high pressure and low pressure lines in accordance with actuation of a height sensing switch or switches which sense a variation of the sprung mass of a vehicle from the desired standing height. The height control switches aforedescribed comprise relatively movable contacts which are moved in response to changes in the height of the vehicle sprung mass to energize one or the other of the air control valves to supply air to or exhaust air from the respective air springs as required.

In accordance with the broader aspects of this invention, a height controlling mechanism is associated with a vehicle suspension mechanism in such a manner as to permit the vehicle operator to select a desired one of a plurality of standing or trim vehicle heights, in any one of which the controlling mechanism will function to maintain such height as the vehicle travels over the road.

More specifically, it is a specific object and feature of this invention to modify the aforedescribed height control switch means to provide a plurality of sets of contacts, any one of which may be selected to perform the height controlling function while providing a reference standing height for the vehicle as desired by the vehicle operator.

Yet more specifically, it is intended within the scope of this invention to provide two sets of relatively movable contacts in the height control leveling switch, each of the sets of contacts being positioned relative to each other to provide two separate reference vehicle standing heights. A multiple position manually operable selector switch is then incorporated in the electrical circuit to select a circuit through one or the other of the sets of contacts to the air spring supply and exhaust lines controlled by the solenoid valves.

These and other objects and features of this invention will become more apparent hereinafter as the description of the invention proceeds, and in which reference is made to the following drawings in which:

Figure 1 is a schematic plan view of a vehicle air suspension utilizing a typical type of electrical height control device;

Figure 2 is a schematic side elevation of the left rear wheel of the vehicle of Figure 1, including the suspension mechanism associated therewith;

Figure 3 corresponds with Figure 2 except for modification thereof according to the teaching of this invention; and Figure 4 is a diagrammatic view of the height control switch of this invention to which reference will be made in explaining the function of this system.

Referring first to Figures 1 and 2 for the purpose of illustrating a typical suspension system in which the present invention may be used, there is shown an air suspension system for a vehicle comprising a sprung mass including the vehicle frame 2, ground engaging wheels 4 supported in the usual manner on axles 6 and a plurality of air spring units 8, 10, 12 and 14 positioned, respectively, at four points on the vehicle in the usual manner. It will be appreciated that the air within the respective air springs controls the relative height of the vehicle sprung mass relative to the ground engaging wheels thereof, suitable means being provided to control the supply of air to and exhaust of air from the respective air springs to maintain this desired standing height. A description of one exemplary type of suspension control means will be described hereinafter.

For the purpose of illustration, a "closed" type of air suspension mechanism has been depicted in Figure 1. This system comprises a high pressure tank supplied in any suitable manner by a source of air under pressure (not shown), a low pressure tank for receiving the exhaust from the respective air springs, a high pressure manifold 16 connected between the high pressure tank and the respective air springs and a low pressure manifold 18 connected between the low pressure tank and the air springs. The high pressure tank is connected by the line 20 to the high pressure manifold 16, and from this manifold through the line 22 to the air spring 8, and by the line 24 to the air spring 10. Furthermore, the lines 22 and 24 respectively connect the air springs 8 and 10 to the low pressure manifold 18 from which air is returned through the line 26 to the low pressure tank. The line 28 is connected through a T-check valve connection 30 having a restriction therein to the front air springs 12 and 14. Through this line, air is supplied to the front spring from the high pressure manifold 16 and exhausted therefrom through the low pressure manifold 18. The T-check valve with restriction is so constructed that high pressure air can flow rapidly from the high pressure manifold through the line 28 to the front air springs 12 and 14, the restricted portion of the T member serving to prevent cross flow of air between the springs 12 and 14 due to rapid oscillation of the vehicle wheels while traversing rough terrain. Obviously, the restriction also serves to slow the exhaust of air from the front springs to the low pressure tank.

A plurality of electrically actuated solenoid valves 32, 34 and 36, respectively, control the flow of air under high pressure from the high pressure tank through the line 20 and manifold 16 to the lines 28, 24 and 22 as indicated in Figure 1. Similarly, a plurality of electrically actuated solenoid valves 38, 40 and 42 control the exhaust of air from the same lines 28, 24 and 22 through the low pressure manifold 18 to the low pressure tank. All of these solenoid actuated valves are normally closed with the vehicle at the desired standing or trim height position.

In the example shown, electrical height adjusting or leveling switches 44 and 46 are respectively associated with the air springs 8 and 10, while an identical switch 48 is mounted at the front portion of the vehicle for controlling both air springs 12 and 14. As will appear more fully hereinafter, each of the height control switches includes relatively movable contacts which will sense the change in height of the sprung mass of the vehicle relative to the vehicle wheels to either supply air to or exhaust air from the respective air springs to maintain the vehicle at the desired standing height. Suitable circuit means is provided to supply electrical energy from a suitable source, such as the vehicle battery 50, through a normally closed energizing switch 52, feed line 54 and the branch circuits 56 to a movable contact member of the respective switches 44, 46 and 48. As will appear more fully hereinafter, as the movable contact member closes the circuit through the other contacts of each height control switch, electrical power will be supplied through the various circuits connected between them and a particular solenoid valve to control the functioning of the system as required.

For the purpose of explaining the height control mechanism of a conventional system as hereindescribed, let us consider only the left rear suspension and control unit therefor as shown more particularly in Figure 2. In this figure of the drawings, numerals identical to those employed with respect to Figure 1 have been used to identify the parts. In addition, however, it will be seen that the left rear height control switch 46 has been mounted on the vehicle frame 2 and includes a pair of spaced contacts 58 and 60 and a movable contact 62 connected through a linkage 64 with an unsprung portion of the vehicle near the rear axle 6. The geometry of the linkage 64 is so selected that the contact members 58 through 62 will be in a position shown in Figure 2 when the car is at the desired standing height.

The source of electrical energy is connected through the circuit 56 to the movable contact 62, while an air intake controlling circuit 66 connects the contact 58 through a time delay device 68 to the high pressure line controlling solenoid valve 34. Similarly, the contact 60 is connected by the circuit 70 through the time delay device 72 to the low pressure line controlling solenoid 40.

In operation, as the sprung mass of the vehicle as represented by the vehicle frame 2 falls below the desired standing height, the contacts 58 and 62 will be closed thereby establishing a circuit through the line 56, switch 46 and the line 66 to actuate the solenoid valve 34 to supply air to the spring 10 until such time as the sprung mass of the vehicle has been elevated to the desired standing height resulting in opening of the contacts 58 and 62. Upon the sprung mass of the vehicle rising above the standing height, such as by reason of vehicle occupants alighting, the reverse occurs. The contacts 60 and 62 close to establish a circuit from the power source through line 70 to the low pressure line controlling solenoid valve 40. It is preferable to use the time delay devices 68 and 72 so that air pressure will not be transferred between the air spring and the respective tanks due to short periods of rapid wheel and frame oscillation such as encountered when the vehicle is traversing irregular terrain. In addition, the amount of off contact travel of the contact 62 between the spaced contacts 58 and 60 may be so designed in conjunction with the linkage geometry to further add to the control sensitivity of the switch 46; that is, the contact 62 will be capable of an interval of movement between the contacts 58 and 60 without energizing the leveling circuits.

Thus it will be seen that such a typical system must be initially installed for a single reference standing height; that is, a height at which the movable contact 62 lies between and out of contact with either of the contacts 58 and 60.

In accordance with the principal feature of the present invention, as illustrated in Figure 3, the circuit and leveling switches for controlling the suspension mechanism have been modified to enable the vehicle operator to select any desired standing height for the vehicle sprung mass. As before, Figure 3 illustrates the suspension and control mechanism associated with the left rear wheel of the vehicle including the air spring 10. Identical numerals to those in Figures 1 and 2 have been employed for identical parts in Figure 3. The difference in Figure 3 resides in the particular leveling switch 74 and the circuit means employed therewith to control operation of the solenoid valves 34 and 40 to enable the vehicle operator to select different vehicle standing heights.

Referring now to Figure 3 specifically, the height control switch 74 of this invention includes two sets of relatively movable contacts, each set of which is substantially identical to the leveling switches 44, 46 and 48 as described in Figures 1 and 2. Thus, the first set of contacts comprise the spaced contact members 76 and 78 adapted for cooperation with a movable contact 80 connected to the control linkage 64. Similarly, the second set of contacts include the spaced contacts 82 and 84 between which the movable contact 86 may move in accordance with operation of the linkage. The vehicle battery is connected as before by the line 56 to both of the movable contacts 80 and 86.

Referring now to the first set of contacts, it will be seen that the contact 76 is connected by the circuit 88 to a contact 90, while the contact 78 is connected through circuit 92 to a contact 94. Similarly, the second set of contacts 82 and 84 are connected, respectively, to the contacts 96 and 98 by the circuits 100 and 102. The high pressure line controlling solenoid valve 34 is connected in circuit with the contact 104 on a multiple position control switch 106. Similarly, the contact 108 on the multiple position control switch is in circuit with the low pressure line controlling solenoid 40, there being, if desired, time delay devices included within the circuits as aforedescrbed. Since it is desirable to have one master switch controlling the leveling switches 74 associated with all the air springs of the vehicle, a suitable number of additional contacts are formed in conjunction with the multiple position control switch as shown, and are connected in an identical manner to the other leveling switches of the suspension mechanism.

In the position shown in Figure 3 of the drawing, the respective height control or leveling switches are not energized. It will be readily apparent that the vehicle operator may rotate the multiple position control switch 106 to close contacts 104 and 90, and contacts 108 and 94 to energize respectively, the contacts 76 and 78 of the first set of contacts of the switch 74. Thus, as the height of the sprung mass of the vehicle varies from the desired standing height, the movable contact will engage one or the other of the contacts 76 and 78 and a circuit will be established through the multiple position control switch 106 to the selected solenoid valve to either supply or exhaust air as required from the air springs.

If the vehicle operator wishes to change the standing height of the sprung mass of the vehicle, and in this case to raise it, he need only further index the multiple position control switch 106 so as to disengage the contacts 104 and 108 from the contacts 90 and 94 and, instead, establish a circuit between these contacts and the contacts 96 and 98. After the control switch 106 has been so indexed, the only circuit which can be established between the electrical power source and the respective solenoid valves is through the second set of contacts. It will be noted in Figure 3 that with the movable contact 80 of the first set of contacts in a position between the spaced contacts of that set, that the movable contact 86 of the second set of contacts is engaged with the contact 82. When the multiple position control switch is indexed to close the circuit containing the second set of contacts, a circuit will therefore be energized between the contact 82 and the high pressure line controlling solenoid valve 34 to supply air to the air springs to lift the sprung mass of the vehicle to a new desired standing height at which time, and with the movable contact 86 disposed between the spaced contacts of the second set of contacts, the movable contact 80 of the first set of contacts will engage the contact 78 of the first set. Since the contact 78 is in circuit with the low pressure line controlling solenoid, it will be apparent that if the control switch 106 is indexed back to the initial position air will be exhausted from the air spring 10 to lower the sprung mass of the vehicle to the lower standing height.

In the example shown in Figure 3, energization of the first set of contacts of the switch 74 might correspond to a low slung disposition of the vehicle having great road stability, while selective actuation of the second set of contacts thereof would correspond to a situation in which the vehicle operator desired, or possibly required, greater vehicle clearance for traversing rutted or other bumpy roads or those having a high crown.

The functioning of the height control switch 74 may be even more apparent by referring to the diagrammatic view thereof as shown in Figure 4, and in which the switch body is indicated at G and a switch actuating shaft indicated at H. An actuating arm, secured to the shaft H, has its center line at A in the lower standing height position. Angular movement of the shaft H counterclockwise, from A will close contacts within the switch when such travel exceeds the increment F. Closing of these contacts will energize circuits to supply air to the springs to raise the car to standing height. Likewise, clockwise movement from position A beyond increment E will close other contacts causing air to exhaust from the springs to lower the car to standing height. Considerable angular travel in either direction for the increment D is permitted by an overtravel mechanism within the switch. With the switch itself mounted on the sprung portion of the car and a link pivotally connecting the arm A to an unsprung member, rotation of the switch actuating shaft H occurs when the car height varies from a trim height.

According to the above invention, the height control switch G would have a duplicate set of contacts which function with the actuating lever in position B. The increments of switch travel E', F' and D' correspond to the increments E, F and D aforedescribed. Angular spacing C would represent the increase or decrease in normal vehicle standing height. Only one set of contacts, corresponding to position A or B, are used at any one time. The multiple position control switch aforedescribed selects the set of contacts which are used.

Thus, it will be readily apparent that the present switch mechanism utilizes a very simple apparatus for converting a conventional structure to one in which the vehicle operator can select one or more vehicle standing heights. However, it is not intended to limit this invention to the specific form selected for illustrative purposes, but only by the scope of the claims which follow.

I claim:

1. In an electrical height control system for a vehicle having a sprung mass, a mechanism for adjusting the height of said sprung mass, said mechanism comprising motor means mounted on said vehicle and operatively connected to said sprung mass to adjust the height of the latter, electrical means for controlling actuation of said motor means; said electrical control means comprising height-responsive switch means mounted on said vehicle, said switch means including a plurality of sets of relatively movable contacts, the contacts of any one set being normally open when the vehicle sprung mass is at the desired standing height and closed when the vehicle sprung mass is at some other height to actuate said motor means, each of said sets of contacts being positioned relative to each other to provide different standing heights for said vehicle sprung mass, a source of electrical energy, and means for connecting said source of energy through a selected set of contacts to said motor actuating means.

2. In an electrical leveling system for a vehicle having a sprung mass, a mechanism for adjusting the height of said sprung mass; said mechanism comprising motor means mounted on said vehicle and operatively connected to said sprung mass to adjust the height of the latter, electrical means for actuating said motor means; said electrical means comprising height-responsive switch means mounted on said vehicle, said switch means including a plurality of sets of relatively movable contacts, any one of said sets of contacts being normally open when the vehicle sprung mass is at the desired standing height and will close when the vehicle sprung mass is at some other height to actuate said motor means, each of said sets of contacts being positioned relative to each other to provide different standing heights for said vehicle sprung mass, a source of electrical energy, and means for connecting said source of energy through a selected set of contacts to said motor actuating means.

3. In combination with a vehicle having a sprung mass suspended on an unsprung portion of the vehicle including ground engaging wheels, a mechanism for adjusting the height of said sprung mass relative to said unsprung vehicle portion; said mechanism comprising motor means mounted on said vehicle and operatively connected to said sprung mass to adjust the height of the latter, means for actuating said motor means, electrical means for controlling said actuating means for said motor means; said electrical control means comprising height-responsive switch means mounted on said vehicle, said switch means including a plurality of sets of relatively movable contacts, each of said sets of contacts being operatively connected respectively to said vehicle sprung mass and said vehicle unsprung portion whereby the contacts of any one set will normally be open when the vehicle sprung mass is at the desired standing height and will close when the vehicle sprung mass is at some other height to actuate said motor means, each of said sets of contacts being positioned relative to each other to provide different standing heights for said vehicle sprung mass, a source of electrical energy, and means for connecting said source of energy through a selected set of contacts to said motor actuating means.

4. In combination with a vehicle having a sprung mass, a mechanism for adjusting the height of said sprung mass; said mechanism comprising motor means mounted on said vehicle and operatively connected to said vehicle sprung mass to adjust the height of the latter, electrical means for actuating said motor means; said electrical means comprising height-responsive switch means mounted on said vehicle, said switch means including a plurality of sets of relatively movable contacts, any one of said sets of contacts being normally open with the vehicle sprung mass at a desired standing height and closed when the sprung mass is at some other height to actuate said motor means, each of said sets of contacts including spaced contacts electrically connected to said motor actuating means and energizable to actuate said motor means to respectively raise and lower the vehicle sprung mass, another contact for selectively energizing one or the other of said two contacts in accordance with the direction in which said vehicle sprung mass varies from the desired standing height, each of said sets of contacts being positioned relative to each other to provide different standing heights for said vehicle sprung mass, a source of electrical energy in circuit with the last named contact of each of said sets of contacts, and means for completing said circuit to said motor actuating means through first named contacts of a selected one set of contacts.

5. In combination with a vehicle having a sprung mass suspended on an unsprung portion thereof including ground engaging wheels, a mechanism for adjusting the height of said sprung mass relative to the unsprung portion of said vehicle; said mechanism comprising motor means mounted on said vehicle and operatively connected to said vehicle sprung mass to adjust the height of the latter, means for actuating said motor means, electrical means for controlling said actuating means for said motor means; said electrical control means comprising height-responsive switch means mounted on said vehicle, said switch means including a plurality of sets of relatively movable contacts, each of said sets of contacts being operatively connected respectively to said vehicle sprung mass and the unsprung portion of said vehicle whereby the contacts of any one set will normally be open with the vehicle sprung mass at a desired standing height and will close when the sprung mass is at some other height to actuate said motor means, each of said sets of contacts including two spaced contacts electrically connected to said motor actuating means and energizable to actuate said motor means to respectively raise and lower the vehicle sprung mass, a third contact for selectively energizing one or the other of said two contacts in accordance with the direction in which said vehicle sprung mass varies from the desired standing height, each of said sets of contacts being positioned relative to each other to provide different standing heights for said vehicle sprung mass, a source of electrical energy in circuit with the third contact of each of said sets of contacts, and means for completing said circuit to said motor actuating means through the other two contacts of a selected one set of contacts.

6. In combination with a vehicle having a sprung mass, a mechanism for adjusting the height of said sprung mass; said mechanism comprising motor means mounted on said vehicle and operatively connected to said vehicle sprung mass to adjust the height of the latter, electrical means for actuating said motor means; said electrical means comprising height-responsive switch means mounted on said vehicle, said switch means including a plurality of sets of relatively movable contacts, each of said sets of contacts being normally open with the vehicle sprung mass at a desired standing height and closed when the sprung mass is at some other height to actuate said motor means, each of said sets of contacts including two spaced contacts electrically connected to said motor actuating means and energizable to actuate said motor means to respectively raise and lower the vehicle sprung mass, a third contact for selectively energizing one or the other of said two contacts in accordance with the direction in which said vehicle sprung mass varies from the desired standing height, each of said sets of contacts being positioned relative to each other to provide different standing heights for said vehicle sprung mass, a source of electrical energy in circuit with the third contact of each of said sets of contacts, and means for completing said circuit to said motor actuating means through the other two contacts of a selected one set of contacts, said last named means including a multiple position control switch.

7. In combination with a vehicle having a sprung mass, a mechanism for adjusting the height of said vehicle sprung mass; said mechanism comprising motor means mounted on said vehicle and operatively connected to said vehicle sprung mass to adjust the height of the latter, electrical means for actuating said motor means; said electrical means comprising height-responsive switch means mounted on said vehicle, said switch means including a plurality of sets of relatively movable contacts, any one of said sets of contacts being normally open when the vehicle sprung mass is at the desired standing height and closed when the sprung mass is at some other height to actuate said motor means, each of said sets of contacts including spaced contacts and a control contact for selectively energizing one of said spaced contacts in accordance with the direction which said sprung mass varies from the desired standing height, each of said sets of contacts being positioned relative to each other to provide different standing heights for said vehicle sprung mass, a source of electrical energy, circuit means connecting said source of electrical energy to the control contact of each of said sets of contacts, circuit means connecting the other spaced contacts of each of said sets of contacts to said motor actuating means, and a multiple position switch in said last named circuit for energizing the latter between a selected one set of contacts and said motor actuating means.

8. In combination with a vehicle air suspension mechanism comprising a vehicle sprung mass, a plurality of air springs supporting said sprung mass, means including a high pressure inlet for supplying air to said air springs, means including a low pressure outlet for exhausting air from said air springs, and electrical control means for controlling the supply of air to and exhaust of air from said air springs to control the standing height of said vehicle sprung mass; said electrical control means comprising electrically operated valve means controlling the flow of air through said inlet, an electrically operated valve means controlling the exhaust of air through said outlet, said valves being normally closed when said vehicle sprung mass is at the desired standing height, means for selectively actuating said valves to raise and lower said vehicle sprung mass in accordance with the direction in which the latter varies from a desired standing height; said valve actuating means comprising a height-responsive switch means, said switch means including a plurality of sets of relatively movable contacts, any one of said sets of contacts being normally open with the vehicle at standing height and closed at some other height to actuate one of said valves, each of said sets of contacts being positioned relative to each other to provide different standing heights for said vehicle sprung mass, a source of electrical energy, circuit means electrically connecting said source to said sets of contacts, and means for connecting a selected one set of contacts in circuit with said valves.

9. In combination with a vehicle air suspension mechanism comprising a vehicle sprung mass, and a plurality of air springs supporting said sprung mass, means including a high pressure air line for supplying air to said air springs, means including a low pressure air line for exhausting air from said air springs, and electrical control means for controlling the supply of air to and exhaust of air from said air springs to control the standing height of said vehicle sprung mass; said electrical control means comprising an electrically operated solenoid valve controlling the flow of air through said high pressure line, an electrically operated solenoid valve controlling the exhaust of air through said low pressure line, said valves being normally closed when said vehicle sprung mass is at the desired standing height, means for selectively actuating said valves to raise and lower said vehicle sprung mass in accordance with the direction in which the latter varies from a desired standing height; said actuating means comprising a height-responsive switch means, said switch means including a plurality of sets of normally open contacts, any one of said sets of contacts being normally open with the sprung mass at standing height and closed at some condition in variance therewith to actuate one of said valves, each of said sets of contacts being positioned relative to each other to provide different standing heights for said vehicle sprung mass, a source of electrical energy, circuit means electrically connecting said source to said sets of contacts, and circuit means including a multiple position control switch for connecting a selected one set of contacts to said valves.

10. In combination with a vehicle air suspension mechanism comprising a vehicle sprung mass including a vehicle frame, ground engaging wheels, and a plurality of air springs operatively connected between said wheels and vehicle frame to control relative movement therebetween, means including a high pressure air line for supplying air to said air springs, means including a low pressure air line for exhausting air from said air springs, and electrical control means for controlling the supply of air to and exhaust of air from said air springs to control the standing height of said vehicle sprung mass relative to said vehicle wheels; said electrical control means comprising an electrically operated solenoid valve controlling the flow of air through said high pressure line, an electrically operated solenoid valve controlling the exhaust of air through said low pressure line, said valves being normally closed when said vehicle sprung mass is at the desired standing height, means for selectively actuating said valves to raise and lower said vehicle sprung mass in accordance with the direction in which the latter varies from a desired standing height; said actuating means comprising a height-responsive switch means, said switch means including first and second sets of contacts, each of said sets of contacts including two spaced contacts connected for movement with said vehicle sprung mass, and a third contact movable between said pair of contacts and operatively connected to said vehicle wheels, each of said sets of contacts being positioned relative to each other to provide different standing heights for said vehicle sprung mass, a source of electrical energy, circuit means electrically connecting said source to the third contact of each of said sets of contacts, circuit means connecting the two spaced contacts of each of said set of contacts to said high pressure and low pressure line controlling solenoid valves, and a multiple position control switch in said last named circuit means for energizing the latter between a selected one set of contacts and said solenoid actuated valves.

11. In combination with a vehicle having a sprung mass suspended on an unsprung portion of the vehicle including ground-engaging wheels, a mechanism for controlling the height of said sprung mass from a selected one of a plurality of reference standing heights relative to said unsprung vehicle portion; said mechanism comprising motor means mounted on said vehicle and operatively connected to said sprung mass to control the height of the latter from a reference standing height, means for actuating said motor means; said actuating means comprising relatively movable height-responsive means operatively connected respectively to said vehicle sprung and unsprung masses, one of said height-responsive means including a plurality of control stations each independently selectively cooperable with the other of said height-responsive means to control the height of said sprung mass relative to a selected standing height, and means for activating a selected one of said control stations thereby selecting one of said reference standing heights.

12. In combination with a vehicle having a sprung mass suspended on an unsprung portion of the vehicle including ground-engaging wheels, a mechanism for controlling the height of said sprung mass relative to said unsprung vehicle portion in a plurality of ranges each including a reference standing height; said mechanism comprising motor means mounted on said vehicle and operatively connected to said sprung mass to control the height of the latter from a reference standing height, means for actuating said motor means; said actuating means comprising relatively movable height-responsive means operatively connected respectively to said vehicle sprung and unsprung masses, one of said height-responsive means including means forming a plurality of control ranges including a reference standing height each independently selectively cooperable with the other of said height-responsive means to control the height of said sprung mass relative to a selected standing height, and means for selecting one of said control ranges thereby selecting one of said reference standing heights.

References Cited in the file of this patent
UNITED STATES PATENTS

| | | |
|---|---|---|
| 2,443,433 | Sanmori | June 15, 1948 |
| 2,644,699 | Weiertz | July 7, 1953 |
| 2,762,633 | Gouirand | Sept. 11, 1956 |